United States Patent [19]
Grill et al.

[11] 3,989,446
[45] Nov. 2, 1976

[54] METHOD AND KILN FOR CALCINING FINELY DIVIDED MATERIAL

[75] Inventors: Michael Grill, Leoben; Helmut Grohmann, St. Jakob near Mixnitz, both of Austria

[73] Assignee: Veitscher Magnesitwerke-Aktiengesellschaft, Vienna, Austria

[22] Filed: Mar. 19, 1975

[21] Appl. No.: 559,811

[30] Foreign Application Priority Data
Mar. 25, 1974 Austria .................. 2436/74

[52] U.S. Cl. .................. 432/14; 159/4 A; 432/58
[51] Int. Cl.² .................. F27B 15/00
[58] Field of Search .......... 432/14, 15, 58; 34/10, 34/57 R, 57 B, 57 E; 159/4 A

[56] References Cited
UNITED STATES PATENTS

| | | | |
|---|---|---|---|
| 920,333 | 5/1909 | Hughes | 432/58 |
| 2,306,462 | 12/1942 | Moorman | 432/58 |
| 2,666,269 | 1/1954 | Parry | 34/10 |
| 2,891,846 | 6/1959 | Knight | 432/58 X |
| 3,265,775 | 8/1966 | Friedrich | 432/58 |
| 3,740,865 | 6/1973 | Lagvilharre | 34/57 E |
| 3,752,455 | 8/1973 | Zacpal | 34/57 E |
| 3,773,892 | 11/1973 | Reimann et al. | 34/10 |

*Primary Examiner*—John J. Camby
*Attorney, Agent, or Firm*—Kurt Kelman

[57] ABSTRACT

An aqueous solution of magnesium chloride is sprayed into a kiln chamber where it is countercurrently heat treated by a stream of hot gas produced by flames projected into the chamber by burners. Calcined material is removed from the bottom of the kiln chamber and the hot gas stream and any treated material carried thereby is removed from the top of the chamber. Material carried by the hot gas stream is separated therefrom in a cyclone separator and the separated material is returned to the kiln chamber through a zone heated to a temperature in the range of the temperature in the kiln chamber.

16 Claims, 7 Drawing Figures

METHOD AND KILN FOR CALCINING FINELY DIVIDED MATERIAL

The present invention relates to improvements in the heat treatment of finely divided material, wherein the material is subjected to a treatment temperature in a treatment chamber, such as a calcining kiln, a stream of hot gas is passed into and through the chamber to produce the temperature, treated material is removed from the chamber through a bottom outlet, the hot gas and any material carried thereby is removed from the chamber through a top outlet, and the material carried by the hot gas stream is separated therefrom after removal from the chamber.

Such heat treatment is useful, for example, for the thermal decomposition of magnesium chloride which may be sprayed in the form of an aqueous solution or suspension into the chamber of a roasting or calcining kiln or furnace. However, any finely divided granular material or liquid, such as solutions and dispersions, may be treated in this manner.

In a known heat treating method of the indicated type, a magnesium chloride solution is sprayed through nozzles into the chamber of a calcining kiln, and the major portion of the atomized solution falls by gravity to the bottom of the kiln while the hot fumes or gases produced by burners extending into the kiln chamber stream countercurrently to the falling sprayed material. In this manner, the atomized solution is first dried and is then thermally decomposed into magnesium oxide and hydrochloric acid. The magnesium oxide is removed from the bottom of the kiln while the hydrochloric acid is removed at the top of the kiln with the stream of hot gases. However, a portion of the material sprayed into the kiln chamber does not reach the bottom of the kiln but is carried by the countercurrent stream of hot gases, some of it even before it has reached the level of the heating zone defined by the flames emanating from the burners, and is removed with the fumes and reaction gases passing out of the kiln chamber. The material removed with the flue gases, which for the most part has undergone insufficient heat treatment, is separated from the gases outside the kiln and is returned to the kiln chamber for further treatment through a chute pipe. Experience has shown, however, that it is not possible to obtain complete heat treatment of the removed material in this manner.

It is a primary object of this invention to improve this type of heat treatment so that a complete treatment of the material returned to the kiln chamber is achieved in a relatively simple manner.

This and other objects are accomplished in accordance with the invention by returning the separated material to the treatment chamber through a zone heated to a temperature in the range of the treatment temperature.

Throughout this specification and the claims, the "range of the treatment temperature" designates a temperature range within which a desired chemical or physical reaction takes place in the treatment chamber.

The above and the other objects, advantages and features of the present invention will become more apparent from the following detailed description of now preferred embodiments thereof, taken in conjunction with the accompanying drawing wherein FIG. 1 is a longitudinal cross section of a conventional calcining kiln with spray nozzles for introducing a magnesium chloride solution into the kiln chamber for heat treatment therein;

Figure 1:
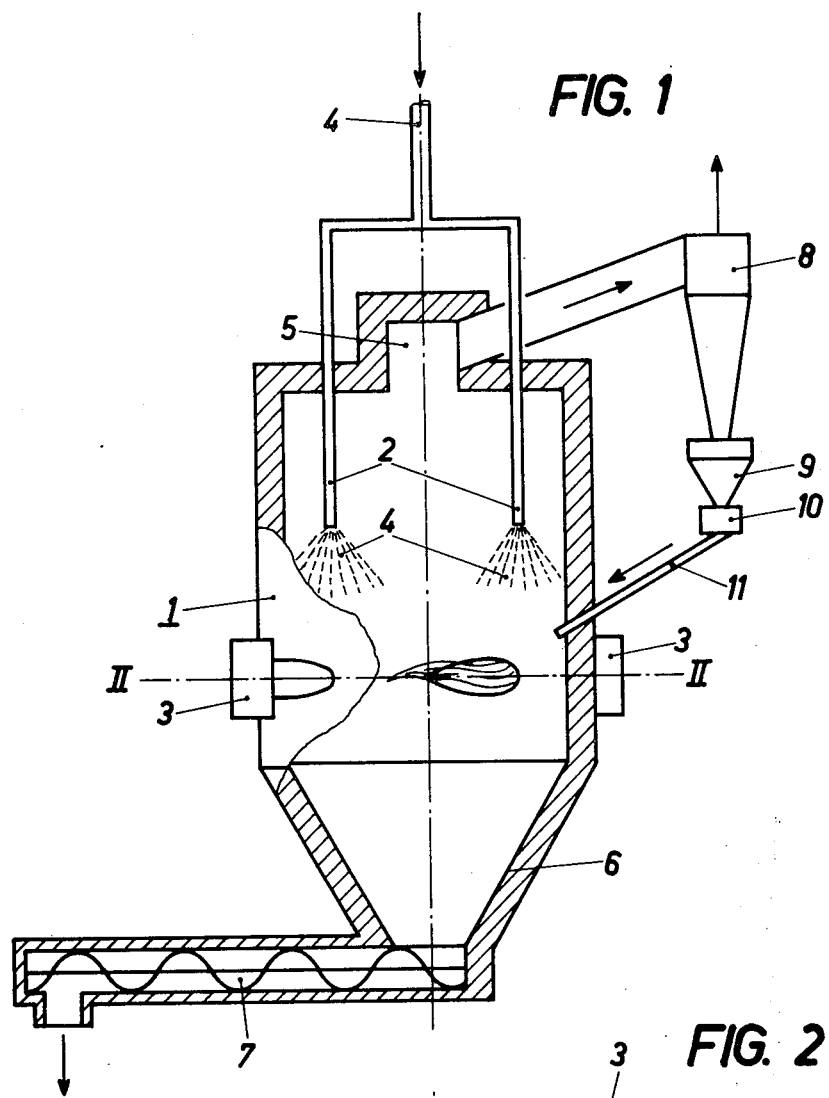
Figure 2:
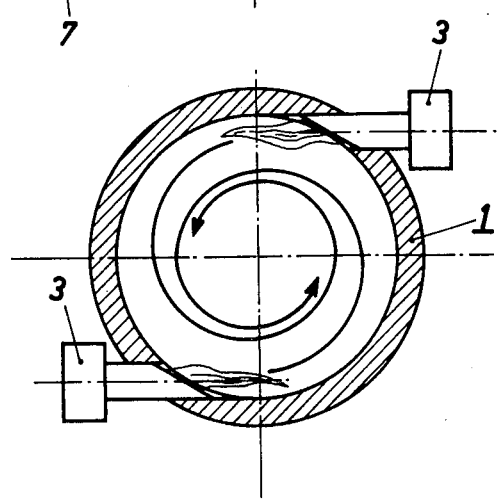
FIG. 2 is a transverse cross section along lines II—II of FIG. 1.

Referring to the prior art kiln shown in FIGS. 1 and 2, which may be used for the thermal decomposition of magnesium chloride or other thermally decomposable metal salts, kiln 1 defines a treatment chamber into which extend spray nozzles 2 for introducing an atomized solution of the material to be heat treated into the kiln chamber. Two burners 3 extend into the kiln chamber in a plane below the spray nozzles and the burners project flames into the chamber which constitute a heating zone and produce fumes of hot gases streaming upwardly in the kiln chamber countercurrently to the falling sprayed material. The atomized material 4 passes through heating zone 20 in the region of the burners which are shown to extend tangentially into the kiln chamber at diametrically opposite points. A stream of hot gases rises from the heating zone, these gases being constituted by the fumes emanating from the burner flames as well as reaction gases produced by the heat treatment of the finely divided material 4. As indicated by the arrows in FIG. 2, the stream of hot gases swirls spirally upwardly through the kiln chamber and is removed at head 5 of the kiln through a flue.

The major portion of the heat treated material falls by gravity through the upwardly swirling stream of hot gases into the conical bottom 6 of kiln 1 and is removed through an outlet by screw conveyor 7. During the heat treatment of finely divided material 4, the countercurrently flowing hot gases first dry the material and then thermally treat the same. If an aqueous magnesium chloride solution is treated, it is thermally decomposed according to the reaction equation

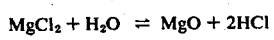

$$MgCl_2 + H_2O \rightleftharpoons MgO + 2HCl$$

The magnesium oxide is removed by conveyor 7 while the hydrochloroic acid is removed through the flue with the hot gases.

Some of the dried material, which has been calcined or decomposed only incompletely, is carried along with the stream of hot gases and removed from the treatment chamber therewith. This material is separated from the hot gases in cyclone separator 8 and the separated material leaves the cyclone separator at the bottom thereof to come to rest in receptacle 9 which is closed off by rotary gate 10 to permit the material to pass into chute pipe 11 leading back into the kiln chamber above the level of heating zone 20 in the plane of burners 3. The material is thus returned to the treatment chamber and falls into conical bottom 6 along the walls of the kiln through the heating zone for further heat treatment.

However, experience has shown that the returned material often is not fully decomposed during its pass through the heating zone. This has been overcome by the arrangement according to this invention, two embodiments thereof being illustrated in FIGS. 3 to 5. All parts designated by like reference numerals in all drawing figures function in an equivalent manner.

Figure 3:
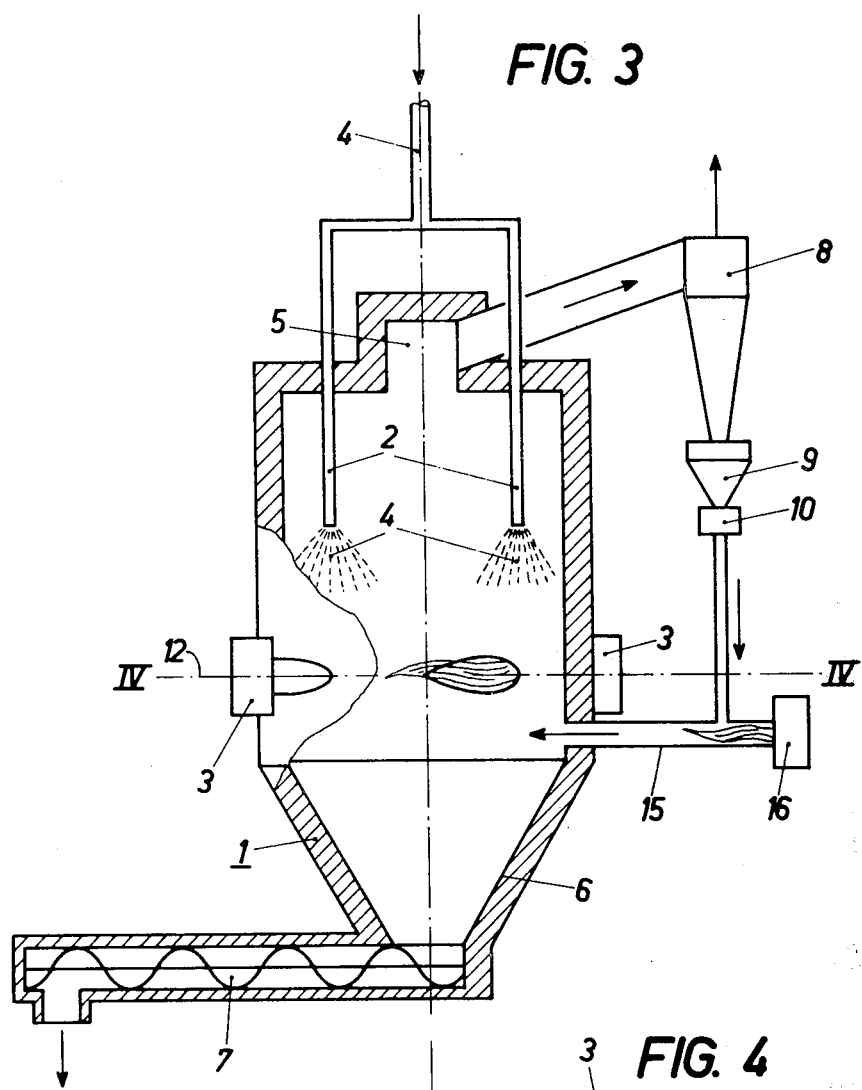
FIG. 3 is a view similar to that of FIG. 1, showing one embodiment of the improvement of the kiln according to this invention.
Figure 4:
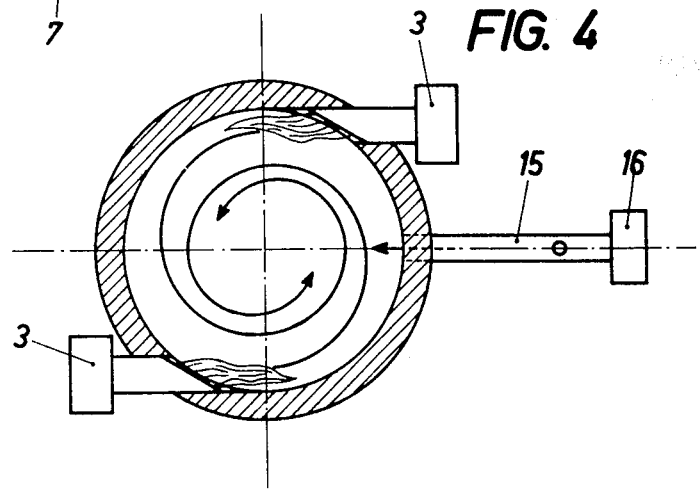
FIG. 4 is a section along lines IV—IV of FIG. 3.

The embodiment of FIGS. 3 and 4 differs from the conventional kiln of FIG. 1 only in the arrangement of the return of partially treated material to the kiln chamber. While two main burners 3, 3 have been shown tangentially arranged and diametrically opposed at a burner level 12, any suitable number of burners may be used in different arrangement patterns. Thus, the illustrated burner arrangement is in no way essential to the invention according to which the separated material coming through gate 10 is passed by gravity into flame tube 15. Auxiliary burner 16 projects a flame into tube or flash calciner 15 and the fumes from the flame heat the tube to a temperature in the range of the treatment temperature prevailing in the kiln chamber. The stream of hot gases in the flash calciner conveys the material therethrough in the direction of the horizontal arrow shown in FIG. 3 and calcines or roasts the material on its way back into the kiln chamber at the treatment temperature. The thermally treated material passes into the kiln chamber and falls into conical bottom 6 of the kiln where it is mixed with the treated material that has passed through the heating zone in the chamber.

Since the heating of flash calciner 15 may be chosen within wide limits by suitable control of burner 16, it is possible to subject the returned material to heat treatment equivalent to that in the kiln chamber so that the returned material will have been treated identically and the mixture removed from the bottom of the kiln will be uniformly and fully heat treated to obtain the desired reaction. The structural arrangement achieving this result is very simple and involves little cost. It also has the advantage of delivering additional heat to the kiln chamber whereby the efficiency of the heat treatment in the chamber is increased so that the total heat required for the treatment in the kiln is not substantially increased. The returned material is intensively heated in a brief period of time with little additional heat requirement.

The velocity of the stream of hot gases in flash calciner 15 is so selected that all of the material delivered into tube 15 from separator 8 is fully conveyed into the kiln chamber. The temperature in the flash calciner may be controlled independently of that prevailing in the kiln treatment chamber, the amount of heat supplied to flame tube 15 being small in relation to the total heat required for the treatment in the kiln. Where the material is returned to the kiln chamber in the region of the main burners 3 but below their level 12, the heating conditions in tube 15 are largely independent of those in the heating zone in the kiln, the hot gases emanating from tube 15 contributing to the heating of the treatment chamber in the kiln. On the other hand, if the material were returned through the flash calciner into or above the heating zone in the kiln chamber, the returned material would be subjected to additional heat treatment in this zone.

In the embodiment of FIGS. 3 and 4, flame tube 15 extends radially in respect of the kiln chamber axis. In this arrangement, the returned material is radially inwardly projected over a distance determined by the velocity of the hot gas stream in the tube into the kiln chamber where it is subjected to heat from the flames of main burners 3 for additional heat treatment. However, if it were desired to utilize the cyclone-like gas stream in the kiln chamber, the flame tube could also be arranged tangentially instead or radially to inject the returned material into the cyclone stream.

Figure 5:
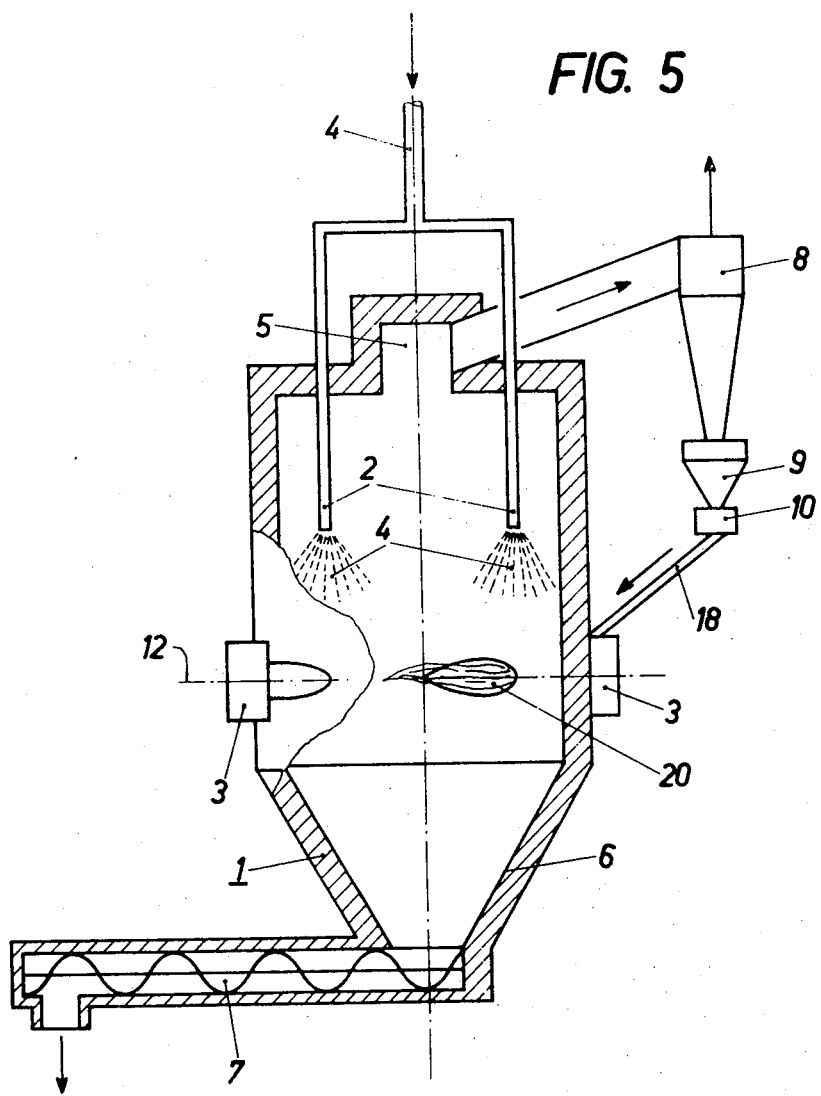
FIG. 5 illustrates a second embodiment of the invention.

An even simpler arrangement is shown in FIG. 5 wherein no special flash calciner is used but the return conduit 18 simply leads to one of the flames produced by the main burners, i.e. the combustion chamber 20 of one of the main burners. The conduit 18 may lead to a suitably structured combustion chamber of one of the burners 3 or it may open into the kiln chamber so that the returned material passes by gravity from pipe 18 through the flame of the burner. In this manner, the returned material is heat treated by the hot gases in the combustion chamber or flame while being conveyed into the interior of the kiln chamber by the stream of these hot gases. During this brief period of time, the returned material is subjected to intensive heat treatment and then falls into the bottom of the kiln whence it is removed by conveyor 7.

While the treatment in calcining kilns with spray nozzles has been described by way of example, it may be successfully used in other types of kilns wherein finely divided material is subjected to treatment by streams of hot gases and some of the material is carried by these gas streams, such as fluidized bed furnaces or spray driers and the like. Also, while the treatment of magnesium chloride has been mentioned, the method and apparatus of this invention may be widely used with any materials subjected to heat treatment, such as the thermal decomposition of nitrates, sulfates, carbonates or hydroxides of iron, aluminum, nickel, cobalt, chromium and other metals, as well as in processes wherein no chemical reaction occurs but which effect only physical changes, for example sintering or other heat treatments.

Figure 6:
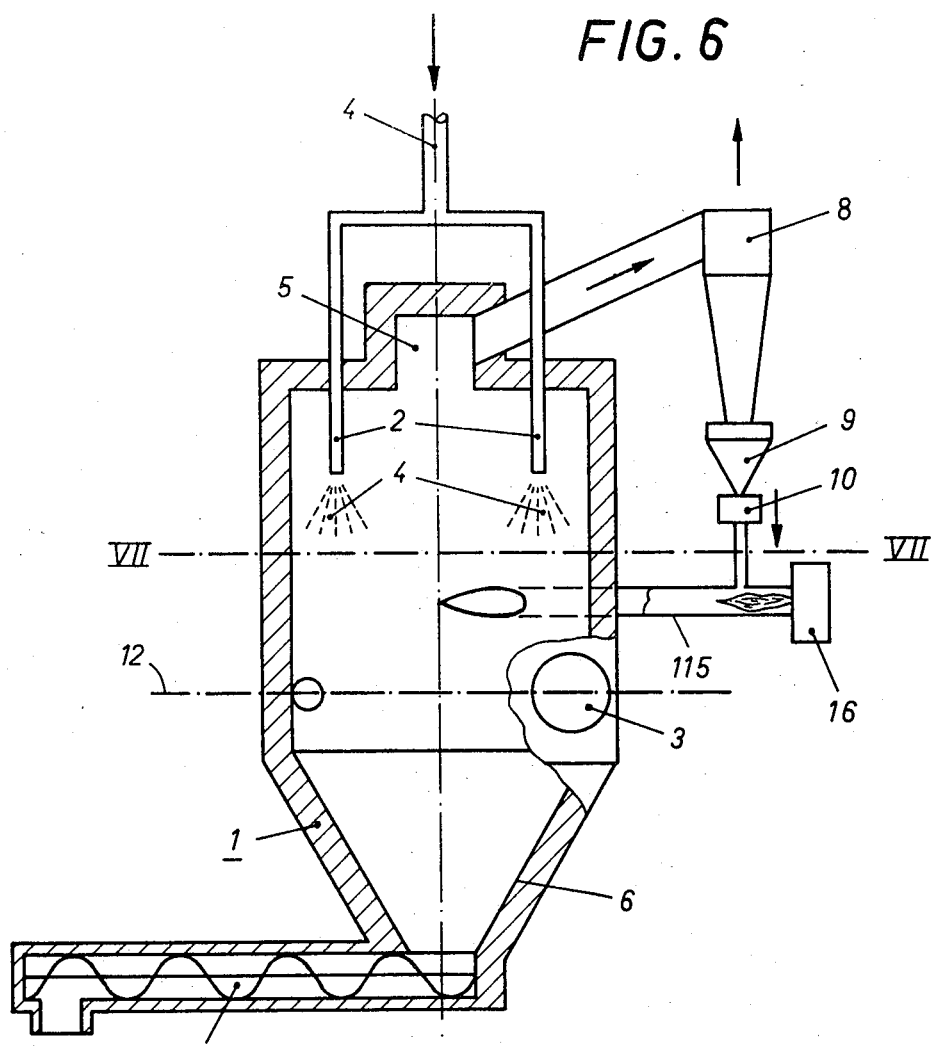
FIG. 6 is a view similar to that of FIG. 3, showing a third embodiment of the kiln according to this invention.
Figure 7:
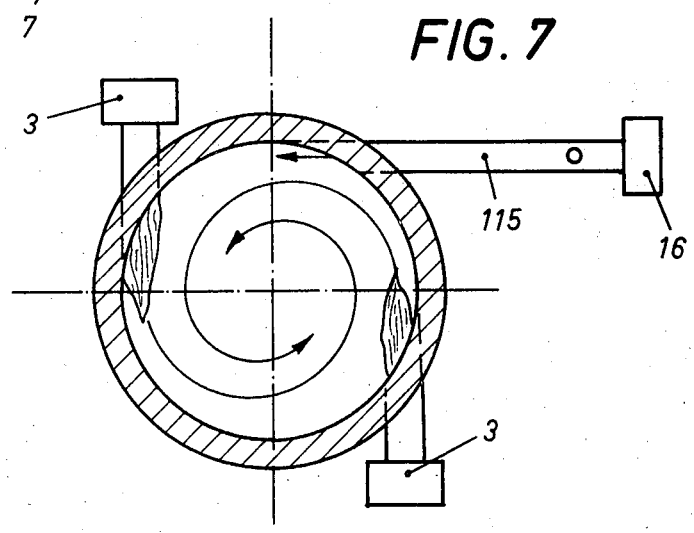
FIG. 7 is a section along lines VII—VII of FIG. 6.

In the embodiment of FIGS. 6 and 7, the flame tube of flash calciner 115 extends tangentially in respect of the kiln chamber axis, and is connected to return the calcined material to the kiln chamber in the region of the main burners 3 but above their level 12.

What is claimed is:

1. In a method of heat treating finely divided material, wherein the material is introduced into a treatment chamber at a first inlet zone and is subjected to a treatment temperature in the treatment chamber, a stream of hot gas is passed into and through the chamber to produce said temperature, completely heat treated material is removed from the chamber through one outlet, the hot gas stream carries along some of the material not completely heat treated, the gas stream with the incompletely heat treated material is removed from the chamber through another outlet, the incompletely heat treated material carried by the hot gas stream is separated therefrom after removal from the chamber, and returning the separated material to the treatment chamber at a second inlet zone spaced from the first inlet zone: the step of returning the separated material through a confined zone heated to a temperature in the range of the treatment temperature.

2. In the method of claim 1, the finely divided material being a spray of an aqueous solution of magnesium chloride.

3. In the method of claim 1, the step of projecting a flame into the confined zone.

4. In the method of claim 3, the confined zone being a pipe into which the flame is projected.

5. In the method of claim 4, a heating zone level defined by burner means extending into the treatment chamber in a plane and the pipe returning the separated material to the chamber below said level.

6. In the method of claim 1, the hot gas stream being produced by burner means having a combustion chamber and the separated material being returned to the treatment chamber through the combustion chamber.

7. In a kiln for heat treating finely divided material which defines a treatment chamber and comprises a first inlet means for delivering the finely divided material into the treatment chamber, main burner means extending into the chamber at a level spaced from and below the first inlet means to produce a stream of hot gas passing into and through the chamber, an outlet spaced from and below the main burner means for removing completely heat treated material from the kiln chamber, another outlet spaced from and above the first inlet means for removing the hot gas stream and not completely heat treated material carried thereby, means for separating the incompletely heat treated material carried by the hot gas stream therefrom outside the kiln chamber, and at least one conduit receiving the separated material and returning the same to the kiln chamber in the region of the main burner means: means for heating at least a part of the return conduit to a temperature in the range of the treatment temperature.

8. In the kiln of claim 7, the main burner means extending into the kiln chamber in a plane defining a heating zone level, and the return conduit communicating with the kiln chamber below said level.

9. In the kiln of claim 7, the return conduit extending radially in respect of the kiln chamber.

10. In the kiln of claim 7, the main burner means extending into the kiln chamber in a plane defining a heating zone level, and the return conduit being a flame tube, said heating means being constituted by auxiliary burner means projecting a flame into the flame tube.

11. In the kiln of claim 10, the flame tube communicating with the kiln chamber below said level.

12. In the kiln of claim 7, the return conduit passing the returned material through the main burner means into the kiln chamber, the main burner means constituting said heating means.

13. In the kiln of claim 7, the main burner means extending into the kiln chamber in a plane defining a heating zone level, and the return conduit communicating with the kiln chamber above said level.

14. In the kiln of claim 7, the return conduit extending tangentially in respect of the kiln chamber.

15. In the kiln of claim 7, the main burner means defining a combustion chamber, and a means for providing communication between the return conduit and the combustion chamber whereby the heat from the combustion chamber heats at least a part of the return conduit.

16. In the kiln of claim 7, the main burner means having flash calciner means attached thereto, the flash calciner means constituting the return conduit for returning the separated material to the kiln chamber.

* * * * *